(12) United States Patent
Lutz et al.

(10) Patent No.: US 7,625,977 B2
(45) Date of Patent: Dec. 1, 2009

(54) ADHESIVE OF EPOXY RESIN, TOUGHENER AND BLOCKED ISOCYANATE POLYTETRAHYDROFURAN TOUGHENER

(75) Inventors: Andreas Lutz, Galgenen (CH); Daniel Schneider, Wädenswil (CH)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 12/142,261

(22) Filed: Jun. 19, 2008

(65) Prior Publication Data

US 2008/0319105 A1     Dec. 25, 2008

Related U.S. Application Data

(60) Provisional application No. 60/936,419, filed on Jun. 20, 2007.

(51) Int. Cl.
*C08L 63/00* (2006.01)
*C08L 63/02* (2006.01)
*C09J 163/02* (2006.01)

(52) U.S. Cl. ............... 525/65; 156/330; 525/454
(58) Field of Classification Search ............... None
See application file for complete search history.

(56) References Cited

U.S. PATENT DOCUMENTS

| | | | |
|---|---|---|---|
| 4,931,482 A | 6/1990 | Lamberts | |
| 5,202,390 A | 4/1993 | Mulhaupt | |
| 5,278,257 A | 1/1994 | Mulhaupt | |
| 5,290,857 A | 3/1994 | Ashida | |
| 5,686,509 A | 11/1997 | Nakayama | |
| 6,776,869 B1 | 8/2004 | Shenkel | |
| 6,884,854 B2 | 4/2005 | Shoenfeld | |
| 7,511,097 B2 * | 3/2009 | Frick et al. | 525/113 |
| 2005/0022929 A1 | 2/2005 | Shoenfeld | |
| 2005/0070634 A1 | 3/2005 | Lutz | |
| 2005/0209401 A1 | 9/2005 | Lutz | |
| 2005/0215730 A1 | 9/2005 | Shoenfeld | |
| 2006/0205897 A1 | 9/2006 | Frick | |
| 2006/0276601 A1 | 12/2006 | Lutz | |
| 2007/0066721 A1 | 3/2007 | Kramer | |
| 2008/0045670 A1 * | 2/2008 | Lutz et al. | 525/404 |

FOREIGN PATENT DOCUMENTS

| | | |
|---|---|---|
| EP | 1632533 | 3/2006 |
| WO | WO 2005-007720 | 1/2005 |
| WO | WO 2005-118734 | 12/2005 |

OTHER PUBLICATIONS

Derwent accession No. 2005-152074 for WO 2005/007766 or U.S. Publication No. 2005/0070634, Lutz et al., Jan. 27, 2005, one page.*

* cited by examiner

*Primary Examiner*—Robert Sellers
(74) *Attorney, Agent, or Firm*—Gary C. Cohn PLLC

(57) ABSTRACT

Epoxy adhesive compositions contain an epoxy resin, rubber modification, a toughener and a curing agent. The tougher has capped epoxide-reactive groups, and at least one polytetrahydrofuran block having a mass of 2200-4500 daltons. The selection of toughener in a rubber-modified epoxy-based structural adhesive provides for very good low temperature performance.

16 Claims, No Drawings

ADHESIVE OF EPOXY RESIN, TOUGHENER AND BLOCKED ISOCYANATE POLYTETRAHYDROFURAN TOUGHENER

This invention claims priority from U.S. Provisional Application No. 60/936,419, filed 20 Jun. 2007.

This invention relates to a toughened epoxy resin based adhesive.

Epoxy resin based adhesives are used to bond a variety of different substrates together.

In certain applications, the adhesive must maintain good bonding to the substrate and good impact resistance over a very wide temperature range. For example, epoxy resin adhesives are used in the automotive industry metal-metal bonding in frame and other structures. Adhesive bonding can reduce the number of welds that are needed to construct the frame, and for that reason the use of these adhesives can reduce assembly costs. The adhesive will be subjected to a very wide range of temperatures during subsequent manufacturing processes and during the lifetime of the vehicle. These temperatures may be as high as 80° C. Automobiles that are used in cold climates may be exposed to temperatures as low as −40° C.

Structural adhesives potentially offer similar advantages in aerospace manufacturing as they do in the automotive sector-reduced vehicle weight and reduced manufacturing costs. However, aircraft are routinely exposed to temperatures as low at −60 to −70° C. when they operate at altitudes of 30,000 feet or more, which is common in the industry. Structural adhesives used in these applications must retain adequate adhesion and impact resistance at these temperatures.

Many structural adhesives used in automotive applications are based on a rubber-modified epoxy resin and a reactive "toughener". Structural adhesives of these types are described in, for example, U.S. Pat. Nos. 5,202,390, 5,278,257, WO 2005/118734, U.S. Published Patent Application No. 2005/0070634, U.S. Published Patent Application No. 2005/0209401, U.S. Published Patent Application 2006/0276601 and EP-A-0 308 664. Unfortunately, these structural adhesives tend to exhibit a substantial drop in performance at temperatures of −40° C. or below. It would be desirable to provide a structural adhesive that has good adhesive and impact properties, and which retains those properties better at temperatures as low as −60 to −70° C.

In WO 2005/007720 and US 2007/0066721, an adhesive system is described which contains a polytetrahydrofuran-based toughener based on polytetrahydrofuran (PTHF, also known as polytetramethylene glycol, PTMEG, polytetramethylene oxide, and PTMO). The adhesives described there are not rubber-modified. WO 2005/007720 and US 2007/0066721 describe tougheners based on PTHF polymers having various molecular weights. In those systems, the molecular weight of the PTHF is reported to have little impact on adhesive properties.

This invention is a one-component structural adhesive, comprising:
A) one or more epoxy resins;
B) at least one toughening rubber;
C) a polytetrahydrofuran-based toughener that has isocyanate groups that are blocked or capped with a phenolic compound, an aminophenolic compound, a primary or secondary aliphatic or cycloaliphatic amine, an alalkyl alcohol, an aromatic amine, an alakyl benzyl amine or an alkyl thiol; and
D) one or more epoxy curing agents;

wherein the polytetrahydrofuran-based toughener is a liquid or low-melting material having capped or blocked reactive groups and at least one polytetrahydrofuran block with a weight of from 2200 to 4500 daltons.

It has been found that the presence of the particular polytetrahydrofuran-based toughener tends to impart very good adhesive strength and impact strength to the structural adhesive at temperatures from −40 to −60° C. and sometimes even as low as −70° C. Thus, the structural adhesive of the invention is suitable for use over a particularly wide range of temperatures.

The structural adhesive of this invention also very surprisingly retains it good adhesive and impact strength values even when the filler contains significant quantities of filler, such as up to 25% by weight of the adhesive composition. This is contrary to the usual case, in which filler adhesive strength and impact strength often become significantly degraded when the filler level exceeds 10 or 15% by weight.

Another advantage of the structural adhesive of this invention is that it has excellent storage stability.

The invention is also method comprising applying the structural adhesive of the invention to the surfaces of two metals, and curing the structural adhesive to form an adhesive bond between the two metals. In preferred aspects, at least one of the metals is galvaneal. The structural adhesive of the invention has been found to bond particularly well to galvaneal.

The structural adhesive contains at least one epoxy resin. All or part of the epoxy resin may be present in the form of a rubber-modified epoxy resin, as discussed more below. A wide range of epoxy resins can be used, including those described at column 2 line 66 to column 4 line 24 of U.S. Pat. No. 4,734,332, incorporated herein by reference.

Suitable epoxy resins include the diglycidyl ethers of polyhydric phenol compounds such as resorcinol, catechol, hydroquinone, bisphenol, bisphenol A, bisphenol AP (1,1-bis(4-hydroxyphenyl)-1-phenyl ethane), bisphenol F, bisphenol K, bisphenol M, tetramethylbiphenol, diglycidyl ethers of aliphatic glycols and polyether glycols such as the diglycidyl ethers of $C_{2-24}$ alkylene glycols and poly(ethylene oxide) or poly(propylene oxide) glycols; polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof.

Suitable diglycidyl ethers include diglycidyl ethers of bisphenol A resins such as are sold by Dow Chemical under the designations D.E.R.® 330, D.E.R.® 331, D.E.R.® 332, D.E.R.® 383, D.E.R.® 661 and D.E.R.® 662 resins.

Commercially available diglycidyl ethers of polyglycols include those sold as D.E.R.® 732 and D.E.R.® 736 by Dow Chemical.

Epoxy novolac resins can be used. Such resins are available commercially as D.E.N.® 354, D.E.N.® 431, D.E.N.® 438 and D.E.N.® 439 from Dow Chemical.

Other suitable additional epoxy resins are cycloaliphatic epoxides. A cycloaliphatic epoxide includes a saturated carbon ring having an epoxy oxygen bonded to two vicinal atoms in the carbon ring, as illustrated by the following structure I:

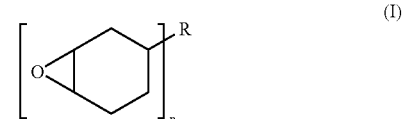

wherein R is an aliphatic, cycloaliphatic and/or aromatic group and n is a number from 1 to 10, preferably from 2 to 4. When n is 1, the cycloaliphatic epoxide is a monoepoxide. Di- or epoxy resins are formed when n is 2 or more. Mixtures of mono-, di- and/or epoxy resins can be used. Cycloaliphatic epoxy resins as described in U.S. Pat. No. 3,686,359, incorporated herein by reference, may be used in the present invention. Cycloaliphatic epoxy resins of particular interest are (3,4-epoxycyclohexyl-methyl)-3,4-epoxy-cyclohexane carboxylate, bis-(3,4-epoxycyclohexyl) adipate, vinylcyclohexene monoxide and mixtures thereof.

Other suitable epoxy resins include oxazolidone-containing compounds as described in U.S. Pat. No. 5,112,932. In addition, an advanced epoxy-isocyanate copolymer such as those sold commercially as D.E.R. 592 and D.E.R. 6508 (Dow Chemical) can be used.

The epoxy resin preferably is a bisphenol-type epoxy resin or mixture thereof with up to 10 percent by weight of another type of epoxy resin. Preferably the bisphenol type epoxy resin is a liquid epoxy resin or a mixture of a solid epoxy resin dispersed in a liquid epoxy resin. The most preferred epoxy resins are bisphenol-A based epoxy resins and bisphenol-F based epoxy resins.

An especially preferred epoxy resin is a mixture of a diglycidyl ether of at least one polyhydric phenol, preferably bisphenol-A or bisphenol-F, having an epoxy equivalent weight of from 170 to 299, especially from 170 to 225, and at least one second diglycidyl ether of a polyhydric phenol, again preferably bisphenol-A or bisphenol-F, this one having an epoxy equivalent weight of at least 300, preferably from 310 to 600. The proportions of the two types of resins are preferably such that the mixture of the two resins has an average epoxy equivalent weight of from 225 to 400. The mixture optionally may also contain up to 20%, preferably up to 10%, of one or more other epoxy resins.

The epoxy resin constitutes at least about 10 weight percent of the structural adhesive, more preferably at least about 15 weight percent, and most preferably at least about 20 weight percent. The epoxy resin preferably constitutes up to about 70 weight percent of the structural adhesive, more preferably up to about 60 weight percent, and most preferably up to about 50 weight percent.

The structural adhesive contains at least one toughening rubber. The toughening rubber should have a glass transition temperature ($T_g$) of no greater than $-25°$ C. Preferably, at least a portion of the toughening rubber has a $T_g$ of $-40°$ C. or lower, more preferably $-50°$ C. or lower and even more preferably $-70°$ C. or lower. The $T_g$ of the toughening rubber may be as low as $-100°$ C. or even lower.

The toughening rubber is preferably present in the form of a rubber-modified epoxy resin, in the form of core-shell particles, or some combination of both.

A rubber-modified epoxy resin is an epoxy-terminated adduct of an epoxy resin and at least one liquid rubber that has epoxide-reactive groups, such as amino or preferably carboxyl groups. The rubber in this case is preferably a homopolymer or copolymer of a conjugated diene, especially a diene/nitrile copolymer. The conjugated diene rubber is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized unsaturated nitrile monomer.

The rubber preferably contains (prior to reaction with the epoxy resin to form the adduct) from about 1.5, more preferably from about 1.8, to about 2.5, more preferably to about 2.2, epoxide-reactive terminal groups per molecule, on average. Carboxyl-terminated rubbers are preferred. The molecular weight ($M_n$) of the rubber is suitably from about 2000 to about 6000, more preferably from about 3000 to about 5000.

Suitable carboxyl-functional butadiene and butadiene/acrylonitrile rubber starting materials are commercially available from Noveon under the tradenames Hycar® 2000X162 carboxyl-terminated butadiene homopolymer and Hycar® 1300X31 Hycar® 1300X8, Hycar® 1300X13, Hycar® 1300X9 and Hycar® 1300X18 carboxyl-terminated butadiene/acrylonitrile copolymers. A suitable amine-terminated butadiene/acrylonitrile copolymer is sold under the tradename Hycar® 1300X21.

The rubber is formed into an epoxy-terminated adduct by reaction with an excess of an epoxy resin. Enough of the epoxy resin is provided to react with all of the epoxide-reactive groups on the rubber and to provide free epoxide groups on the resulting adduct, without significantly advancing the adduct to form high molecular weight species. A ratio of at least two equivalents of epoxy resin per equivalent of epoxy-reactive groups on the rubber is preferred. More preferably, enough of the epoxy resin compound is used that the resulting product is a mixture of the adduct and some free epoxy resin compound. Typically, the rubber and an excess of the epoxy resin are mixed together with a polymerization catalyst and heated to a temperature of about 100 to about $250°$ C. in order to form the adduct. Useful catalysts for conducting the reaction between the rubber and the epoxy resin include those described below. Preferred catalysts for forming the rubber-modified epoxy resin include phenyl dimethyl urea and triphenyl phosphine.

A wide variety of epoxy resins can be used to make the rubber-modified epoxy resin, including any of those described before. Preferred epoxy resins are liquid or solid glycidyl ethers of a bisphenol such as bisphenol A or bisphenol F. Halogenated, particularly brominated, resins can be used to impart flame retardant properties if desired. Liquid epoxy resins (such as DER 330 and DER 331 resins, which are diglycidyl ethers of bisphenol A available from The Dow Chemical Company) are especially preferred for ease of handling.

When a rubber-modified epoxy resin is present, as just described, the rubber-modified epoxy resin will serve as all or part of each of components (A) (the epoxy resin) and (B) (the toughening rubber) of the structural adhesive of the invention. Thus, if a rubber-modified epoxy resin is present, it is not necessary for the structural adhesive to include any additional toughening rubber or any additional epoxy resin. However, one or more such additional epoxy resins may also be present, and one or more additional toughening rubbers, notably a core-shell rubber as described below, may also be present together with a rubber-modified epoxy resin.

Another suitable type of toughening rubber is a core-shell rubber. The core-shell rubber is a particulate material having a rubbery core. The rubbery core preferably has a $T_g$ of less than $-25°$ C., more preferably less than $-50°$ C. and even more preferably less than $-70°$ C. The $T_g$ of the rubbery core may be well below $-100°$ C. The core-shell rubber also has at least one shell portion that preferably has a $T_g$ of at least $50°$ C. By "core", it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked. The rubbery core may constitute from 50 to 95%, especially from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized monounsaturated monomers such as styrene, vinyl acetate, vinyl chloride, methyl methacrylate, and the like. The core polymer is optionally crosslinked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl™.

The shell polymer, which is optionally chemically grafted or crosslinked to the rubber core, is preferably polymerized from at least one lower alkyl methacrylate such as methyl methacrylate, ethyl methacrylate or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer is generally between 20,000 and 500,000.

A preferred type of core-shell rubber has reactive groups in the shell polymer which can react with an epoxy resin or an epoxy resin hardener. Glycidyl groups are suitable. These can be provided by monomers such as glycidyl methacrylate.

A particularly preferred type of core-shell rubber is of the type described in EP 1 632 533 A1. Core-shell rubber particles as described in EP 1 632 533 A1 include a crosslinked rubber core, in most cases being a crosslinked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in EP 1 632 533 A1.

Preferred core-shell rubbers include those sold by Kaneka Corporation under the designation Kaneka Kane Ace, including Kaneka Kane Ace MX 156 and Kaneka Kane Ace MX 120 core-shell rubber dispersions. The products contain the core-shell rubber particles pre-dispersed in an epoxy resin, at a concentration of approximately 25%. The epoxy resin contained in those products will form all or part of the epoxy resin component of the structural adhesive of the invention.

The structural adhesive of the invention preferably has a total rubber content of at least 1 weight percent, more preferably from 3 to 15 weight percent and especially from 4 to 10 weight percent. Total rubber content is calculated for purposes of this invention by determining the weight of core-shell rubber particles (if any), plus the weight contributed by the liquid rubber portion of the rubber-modified epoxy resin(s) (if any), plus the weight of any other toughening rubbers that may be present (if any). In each case, the weight of unreacted (non-rubber-modified) epoxy resins and/or other carriers, diluents, dispersants or other ingredients that may be contained in the core-shell rubber product or rubber-modified epoxy resin is not included. The weight of the shell portion of the core-shell rubber is counted as part of the total toughening rubber content for purposes of this invention.

The polytetrahydrofuran-based toughener (sometimes referred to herein as a "PTHF toughener") is a liquid or low-melting elastomeric material containing at least one polytetrahydrofuran (PTHF) block having a mass of from 2200 to 4500 daltons. The PTHF tougher contains capped or blocked reactive groups. The reactive groups are isocyanate groups that are blocked or capped with a phenolic compound, an aminophenolic compound, a primary or secondary aliphatic or cycloaliphatic amine, an alkyl alcohol, an aromatic amine, an alkyl benzyl amine or an alkyl thiol. The PTHF block or blocks preferably have a molecular weight of from 2500 to 4000 daltons, and more preferably from 2500 to 3500 daltons. The polytetrahydrofuran-based toughener should be soluble or dispersible in the remainder of the reactive components of the structural adhesive.

The polytetrahydrofuran-based toughener preferably has a viscosity at 45° C. which is not greater than 1000 Pa·s and more preferably no more than about 800 Pa·s. Preferably, the weight average molecular weight of the toughener is about 8,000 or greater, and more preferably about 10,000 or greater. Preferably, the weight average molecular weight of the toughener is about 80,000 or less, and more preferably about 40,000 or less. Molecular weights as used herein are determined according to GPC analysis.

The polytetrahydrofuran-based toughener preferably contains an average of no more than 6 blocked or capped terminal groups per molecule. Preferably the average number of such groups is at least 1, more preferably at least 2, up to about 4 per molecule.

General methods for preparing these polytetrahydrofuran-based tougheners are described, for example, in U.S. Pat. No. 5,202,390, 5,278,257, WO 2005/118734, U.S. Published Patent Application No. 2005/0070634, U.S. Published Patent Application No. 2005/0209401, U.S. Published Patent Application 2006/0276601 and EP 1 602 702.

The polytetrahydrofuran-based toughener may be linear, branched or lightly crosslinked.

Preferred polytetrahydrofuran-based tougheners are prepolymers terminated with blocked aliphatic isocyanate groups. These tougheners can be formed in the reaction of a polytetrahydrofuran polyol and an excess of an aliphatic polyisocyanate, and optionally a small quantity of a branching or crosslinking agent having 3 or more isocyanate-reactive group per molecule, to form a prepolymer having free isocyanate groups, which are then blocked. Before the blocking reaction, the prepolymer preferably has an isocyanate content of from 0.5 to 4% by weight.. In these preferred tougheners, the terminal isocyanate groups are blocked with a secondary aliphatic amine, or a phenol, aminophenol, polyphenol, allylphenol, or polyallylpolyphenol such as o,o-diallyl bisphenol A.

The polytetrahydrofuran-based toughener is present in sufficient amount to improve the performance of adhesive compositions containing it under dynamic load. Preferably, the polytetrahydrofuran-based toughener constitutes at least about 5 weight percent of the structural adhesive, preferably at least about 8 weight percent and most preferably at least about 12 weight percent. Preferably, the polytetrahydrofuran-based toughener constitutes up to about 40 weight percent of the structural adhesive, preferably up to about 30 weight percent and more preferably up to about 25 weight percent.

The structural adhesive further contains a curing agent. The curing agent is selected together with any catalysts such that the adhesive cures when heated to a temperature of 80° C., preferably at least 100° C. or greater, but cures very slowly if at all at room temperature (~22° C.) and at temperatures up to at least 50° C. Suitable such curing agents include boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and 4,4'-diaminodiphenylsulphone is particularly preferred.

The curing agent is used in sufficient amount to cure the composition. The curing agent suitably constitutes at least about 1.5 weight percent of the structural adhesive, and more preferably at least about 2.5 weight percent. The curing agent preferably constitutes up to about 15 weight percent of the adhesive composition, more preferably up to about 10 weight percent, and most preferably up to about 6 weight percent.

The structural adhesive will in most cases contain a catalyst for the cure of the adhesive. Among preferred epoxy catalysts are ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethyl)phenol, piperidine or derivates thereof, imidazole derivates, in general $C_1$-$C_{12}$ alkylene imidazole or N-arylimidazols, such as 2-ethyl-2-methylimidazol, or N-butylimidazol, 6-caprolactam, a preferred catalyst is 2,4,6-tris (dimethylaminomethyl)phenol integrated into a poly(p-vinylphenol) matrix (as described in European patent EP 0 197 892). The catalyst may be encapsulated or otherwise be a latent type which becomes active only upon exposure to elevated temperatures. Preferably, the catalyst is present in the adhesive composition in the amount of at least about 0.1 weight percent of the structural adhesive, and most preferably about 0.2 weight percent. Preferably, the epoxy curing catalyst is present in an amount of up to about 2 weight percent of the structural adhesive, more preferably up to about 1.0 weight percent, and most preferably about 0.7 weight percent.

Another optional component is a bisphenol compound that has two or more, preferably two, phenolic hydroxyl groups per molecule. Examples of suitable bisphenol compounds include, for example, resorcinol, catechol, hydroquinone, bisphenol, bisphenol A, bisphenol AP (1,1-bis(4-hydroxylphenyl)-1-phenyl ethane), bisphenol F, bisphenol K, tetramethylbiphenol and the like. The bisphenol component can be dissolved into the structural adhesive composition or present in the form of finely divided particles. Preferably, the bisphenol component is pre-reacted with an epoxy resin (which may incldue a rubber-modified epoxy resin, if present) to advance the resin somewhat.

If used, the bisphenol component is preferably used in an amount from about 3 to about 35 parts by weight per 100 parts by weight of the rubber component. A preferred amount is from about 5 to about 25 parts by weight per 100 parts by weight of the rubber component. When the bisphenol component is added directly into the structural adhesive, it usually constitutes from 0.25 to 2 weight percent, especially 0.4 to 1.5 weight percent, of the adhesive.

The structural adhesive of the invention may contain various other optional components. Among these, fillers, rheology modifiers or pigments, one or more additional epoxy resins and a core-shell rubber are particularly preferred.

A filler, rheology modifier and/or pigment is preferably present in the structural adhesive. These can perform several functions, such as (1) modifying the rheology of the adhesive in a desirable way, (2) reducing overall cost, (3) absorbing moisture or oils from the adhesive or from a substrate to which it is applied, and/or (4) promoting cohesive, rather than adhesive, failure. Examples of these materials include calcium carbonate, calcium oxide, talc, coal tar, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel or metal powders such as aluminum powder or iron powder. Among these, calcium carbonate, talc, calcium oxide, fumed silica and wollastonite are preferred, either singly or in some combination, as these often promote the desired cohesive failure mode.

A filler of particular interest is a microballon having an average particle size of up to 200 microns and density of up to 0.2 g/cc. The particle size is preferably about 25 to 150 microns and the density is preferably from about 0.05 to about 0.15 g/cc. Expanded microballoons which are suitable include those commercially available from Dualite Corporation under the trade designation Dualite™, and also from Lehmann & Voss, Hamburg, Germany. Specific examples of suitable polymeric microballoons include Dualite™ E065-135 and Dualite E130-40D microballoons. In addition, expandable microballoons such as Expancel microspheres, which are available commercially from Akzo Nobel. Microballoons are conveniently present at a level of from about 1 to about 5 weight percent, preferably 1.5 to 3 weight percent, of the structural adhesive. Microballoons are preferably used in conjunction with one or more additional fillers, such as talc, calcium oxide, wollastonite, calcium carbonate, fumed silica or mixtures thereof.

The structural adhesive can further contain other additives such as diluents, plasticizers, extenders, pigments and dyes, fire-retarding agents, thixotropic agents, flow control agents, thickeners such as thermoplastic polyesters, gelling agents such as polyvinylbutyral, adhesion promoters and antioxidants.

Fillers, rheology modifiers, gelling agents, thickeners and pigments preferably are used in an aggregate amount of about 5 parts per hundred parts of adhesive composition or greater, more preferably about 10 parts per hundred parts of adhesive composition or greater. They preferably are present in an amount of up to about 25 weight percent of the structural adhesive, more preferably up to about 20 weight percent. An advantage of this invention is that the structural adhesive retains good adhesive strength and impact strength, even when it contains as much as 15 to 25% by weight of fillers.

The adhesive composition can be applied by any convenient technique. It can be applied cold or be applied warm if desired. It can be applied by extruding it from a robot into bead form on the substrate, it can be applied using manual application methods such as a caulking gun, or any other manual application means. The structural adhesive can also be applied using jet spraying methods such as a steaming method or a swirl technique. The swirl technique is applied using an apparatus well known to one skilled in the art such as pumps, control systems, dosing gun assemblies, remote dosing devices and application guns. The adhesive may be applied to the substrate using a streaming process. Generally, the adhesive is applied to one or both substrates. The substrates are contacted such that the adhesive is located between the substrates to be bonded together.

After application, the structural adhesive is cured by heating to a temperature at which the curing agent initiates cure of the epoxy resin composition. Generally, this temperature is about 80° C. or above, preferably 100° C. or above. Preferably, the temperature is about 220° C. or less, and more preferably about 180° C. or less.

The adhesive of the invention can be used to bond a variety of substrates together including wood, metal, coated metal, aluminum, a variety of plastic and filled plastic substrates, fiberglass and the like. In one preferred embodiment, the adhesive is used to bond parts of automobiles together or parts to automobiles. Such parts can be steel, coated steel, galvanized steel, aluminum, coated aluminum, plastic and filled plastic substrates.

An application of particular interest is bonding of automotive frame components to each other or to other components. The frame components are often metals such as cold rolled steel, galvanized metals, or aluminum. The components that are to be bonded to the frame components can also be metals as just described, or can be other metals, plastics, composite materials, and the like.

Adhesion to brittle metals such as galvaneal is of particular interest in the automotive industry. Galvaneal tends to have a zinc-iron surface that is somewhat rich in iron content and is brittle for that reason. A particular advantage of this invention is that the cured adhesive bonds well to brittle metals such as galvaneal. Another application of particular interest is the bonding of aerospace components, particularly exterior metal components or other metal components that are exposed to ambient atmospheric conditions during flight.

The adhesive composition once cured preferably has a Young's modulus of about 1000 MPa as measured according to DIN EN ISO 527-1. More preferably, the Young's modulus is about 1200 MPa or greater. Preferably, the cured adhesive demonstrates a tensile strength of about 25 MPa or greater, more preferably about 30 MPa or greater, and most preferably about 35 MPa or greater. Preferably, the lap shear strength of a 1.5 mm thick cured adhesive layer is about 15 MPa or greater, more preferably about 20 MPa or greater, and most preferably about 25 MPa or greater measured according to DIN EN 1465.

The following examples are provided to illustrate the invention but are not intended to limit the scope thereof. All parts and percentages are by weight unless otherwise indicated. Products used in the following examples are identified as follows:

DER™ 330 is a liquid diglycidyl ether of bisphenol A, available from The Dow Chemical Company. It has an epoxy equivalent weight of approximately 180.

DER™ 671 is a methyl ethyl ketone solution of a diglycidyl ether of bisphenol A, available from The Dow Chemical Company. It has an epoxy equivalent weight of approximately 425-550.

PTHF Toughener 1 is prepared by mixing 87.9 parts of a 2900 molecular weight PTHF diol and 0.6 parts of trimethylolpropane to 60° C. until homogeneous, then adding 8.2 parts hexamethylene diisocyanate with mixing. 0.2 part of a dibutyltinmercaptide catalyst (Metatin 713, from Acima) is added, and the mixture is allowed to react at 85° C. until the isocyanate content falls to 1.0%. The resulting prepolymer is then capped by reaction with 3.1 parts of 2-allylphenol. The resulting PTHF Toughener 1 has an $M_n$ of 18,300 and an $M_w$ of 70,500.

PTHF Toughener 2 is prepared by mixing 83.5 parts of a 2900 molecular weight PTHF diol and 0.6 parts of trimethylolpropane to 60° C. until homogeneous, then adding 9.7 parts hexamethylene diisocyanate with mixing. 0.2 part of the same catalyst is added, and the mixture is allowed to react at 85° C. until the isocyanate content falls to 2.0%. The resulting prepolymer is then capped by reaction with 6.1 parts of 2-allylphenol. The resulting PTHF Toughener 2 has an $M_n$ of 9,200 and an $M_w$ of 19,500.

PTHF Toughener 3 is prepared by mixing 79.3 parts of a 2900 molecular weight PTHF diol and 0.5 parts of trimethylolpropane to 60° C. until homogeneous, then adding 11.1 parts hexamethylene diisocyanate with mixing. 0.2 part of the same catalyst is added, and the mixture is allowed to react at 85° C. until the isocyanate content falls to 3.0%. The resulting prepolymer is then capped by reaction with 8.8 parts of 2-allylphenol. The resulting PTHF Toughener 3 has an $M_n$ of 6,400 and an $M_w$ of 12,200.

PHTF Toughener 4 is prepared by mixing 84.8 parts of a 2900 molecular weight PTHF diol and 0.6 parts of trimethylolpropane to 60° C. until homogeneous, then adding 9.8 parts hexamethylene diisocyanate with mixing. 0.2 part of the same catalyst is added, and the mixture is allowed to react at 85° C. until the isocyanate content falls to 2.0%. The resulting prepolymer is then capped by reaction with 4.6 parts of diisopropylamine. The resulting PTHF Toughener 4 has an $M_n$ of 9,000 and an $M_w$ of 19,900.

PTHF Toughener 5 is prepared by mixing 70.8 parts of a 2900 molecular weight PTHF diol and 0.5 parts of trimethylolpropane to 60° C. until homogeneous, then adding 8.2 parts hexamethylene diisocyanate with mixing. 0.2 parts of the same catalyst is added, and the mixture is allowed to react at 85° C. until the isocyanate content falls to 2.0%. The resulting prepolymer is then capped by reaction with 20.3 parts of 2,2'-diallylbisphenol A. The resulting PTHF Toughener 5 has an $M_n$ of 11,900 and an $M_w$ of 35,100.

Control Toughener A is an isocyanate-terminated polyurethane prepolymer prepared from a polyether polyol and an aliphatic diisocyanate, in which the isocyanate groups are capped with o,o-diallyl bisphenol A, and is made as described in Example 13 of EP 308 664. Control Toughener A has an $M_n$ of 6,900 and an $M_w$ of 13,200.

Toughening Rubber 3911 is ⅓ by weight of a reaction product of approximately 50% a liquid diglycidyl ether of bisphenol F, 40% of Hycar 1300X13 rubber (a carboxyl-terminated butadiene-acrylonitrile copolymer having a $T_g$ of about −40° C., available from Noveon) and from 2 to 5% of bisphenol A, and ⅔ by weight of a diglycidyl ether of bisphenol A (D.E.R™ 330, from Dow Chemical. Toughening Rubber 3911 is prepared by blending 1 part by weight of Struktol™ 3611 rubber-modified epoxy resin (commercially available from Schill & Seilacher) with 2 parts by weight of the D.E.R. 330 epoxy resin.

Struktol™ 3604 is a reaction product of approximately 60% of a liquid diglycidyl ether of bisphenol A and 40% of Hycar 1300X8 rubber (a carboxyl-terminated butadiene-acrylonitrile copolymer having a $T_g$ of about −52° C., available from Noveon). It is commercially available from Schill & Seilacher.

Struktol™ 3614 is a reaction product of approximately 60% of a liquid diglycidyl ether of bisphenol A and 40% of Hycar 1300X13 rubber (a carboxyl-terminated butadiene-acrylonitrile copolymer having a $T_g$ of about −40° C., available from Noveon). Struktol 3614 is commercially available from Schill & Seilacher.

Kaneka Kane Ace MX 156 is a dispersion of about 25% of a core-shell rubber in an epoxy resin. The core-shell rubber has a crosslinked polybutadiene core. It is available commercially from Kaneka Corporation.

Amicure™ CG-1200 is a cyanoguanidine epoxy hardener available from Air Products and Chemicals.

EP796 is tris(2,4,6-dimethylaminomethyl)phenol in a polymer matrix, as is described in column 2 lines 39-57 and column 4 line 34 through column 6 line 54 of U.S. Pat. No. 4,659,779.

Dynasilan A187 is an epoxy silane available from Degussa, Frankfurt, Germany.

EXAMPLES 1-10 AND COMPARATIVE SAMPLE A

1. Structural Adhesive Preparation

Structural adhesive Examples 1-10 and Comparative Sample A are prepared from the components set forth in Table 1. Two formulating processes, which differ in the order of addition of the starting material, are used to make these.

In the process used to make Structural Adhesive Examples 1-3, 9, 10 and Comparative Sample A, The rubber-modified epoxy resin, additional epoxy resin(s), versatic ester monoepoxy ester and colorants are mixed in a planetary mixer at 90° C. for 30 minutes. The fumed silica is then added and the mixture is stirred at 50° C. for another 30 minutes. Finally the EP 796, Amicure CG 1200 and a polyvinyl butyral gelling compound are added and stirred for 15 minutes. All mixing steps are performed under vacuum. The polytetrahydrofuran-based toughener is then added and the composition mixed until it is homogeneous.

In the process used to make Structural Adhesive Samples 4-8, the polytetrahydrofuran-based toughener is blended in with the first step, and the rubber-modified epoxy resin is stirred in at the end.

TABLE 1

| Components | Parts By Weight Example No. | | | | | | | | | | |
|---|---|---|---|---|---|---|---|---|---|---|---|
| | 1 | 2 | 3 | 4 | 5 | 6 | 7 | 8 | 9 | 10 | A* |
| PTHF toughener 1 | 18.9 | 0 | 0 | 0 | 0 | 0 | 0 | 0 | 0 | 0 | 0 |
| PTHF toughener 2 | 0 | 18.9 | 0 | 18.9 | 18.9 | 18.9 | 18.9 | 18.9 | 0 | 0 | 0 |
| PTHF toughener 3 | 0 | 0 | 18.9 | 0 | 0 | 0 | 0 | 0 | 0 | 0 | 0 |
| PTHF toughener 4 | 0 | 0 | 0 | 0 | 0 | 0 | 0 | 0 | 18.9 | 0 | 0 |
| PTHF toughener 5 | 0 | 0 | 0 | 0 | 0 | 0 | 0 | 0 | 0 | 18.9 | 0 |
| Control Toughener A | 0 | 0 | 0 | 0 | 0 | 0 | 0 | 0 | 0 | 0 | 18.9 |
| Toughening Rubber 3911 | 37.7 | 37.7 | 37.7 | 0 | 0 | 0 | 0 | 0 | 37.7 | 37.7 | 37.7 |
| Struktol 3604 | 0 | 0 | 0 | 18.9 | 0 | 12.6 | 0 | 0 | 0 | 0 | 0 |
| Struktol 3614 | 0 | 0 | 0 | 0 | 18.9 | 0 | 12.6 | 0 | 0 | 0 | 0 |
| MX 156 | 0 | 0 | 0 | 0 | 0 | 0 | 0 | 18.9 | 0 | 0 | 0 |
| DER 330 Epoxy Resin | 5.1 | 5.1 | 5.1 | 24.0 | 24.0 | 30.1 | 30.1 | 24.0 | 5.1 | 5.1 | 5.1 |
| DER 671 Epoxy Resin | 20.1 | 20.1 | 20.1 | 20.1 | 20.1 | 20.1 | 20.1 | 20.1 | 20.1 | 20.1 | 20.1 |
| Versatic Acid monoepoxy ester | 1.2 | 1.2 | 1.2 | 1.2 | 1.2 | 1.2 | 1.2 | 1.2 | 1.2 | 1.2 | 1.2 |
| Dynasilan A187 | 0.7 | 0.7 | 0.7 | 0.7 | 0.7 | 0.7 | 0.7 | 0.7 | 0.7 | 0.7 | 0.7 |
| Colorants | 0.4 | 0.4 | 0.4 | 0.4 | 0.4 | 0.4 | 0.4 | 0.4 | 0.4 | 0.4 | 0.4 |
| Fumed Silica | 8.1 | 8.1 | 8.1 | 8.1 | 8.1 | 8.1 | 8.1 | 8.1 | 8.1 | 8.1 | 8.1 |
| EP796 | 1.1 | 1.1 | 1.1 | 1.1 | 1.1 | 1.1 | 1.1 | 1.1 | 1.1 | 1.1 | 1.1 |
| Polyvinylbutyral | 2.9 | 2.9 | 2.9 | 2.9 | 2.9 | 2.9 | 2.9 | 2.9 | 2.9 | 2.9 | 2.9 |
| Amicure CG-1200 | 3.8 | 3.8 | 3.8 | 3.8 | 3.8 | 3.8 | 3.8 | 3.8 | 3.8 | 3.8 | 3.8 |

*Not an example of the invention.

2. Impact Peel Testing on Cold Rolled Steel at Various Temperatures.

Impact peel testing is performed with each of Examples 1-10 and with Comparative Sample A, in accordance with ISO 11343 wedge impact method. Testing is performed at an operating speed of 2 m/sec. The substrate is 1 mm cold rolled steel 1403.

Multiple test samples are prepared using each adhesive. Test coupons are 90 mm×20 mm with a bonded area of 30×20 mm. The samples are prepared by wiping them with acetone. A 0.15 mm×10 mm wide Teflon tape is applied to the coupons to define the bond area. The structural adhesive is then applied to the bond area of latter coupon and squeezed onto the first coupon to prepare each test specimen. The adhesive layer is 0.2 mm thick. The adhesives are cured at 180° C. for 30 minutes.

Impact peel testing is performed at 23° C., −20° C., −40° C., −50° C. and −70° C.(except for Examples 1 and 3, which are tested only at 23° C. and −40° C., and Example 7, which is also tested at +80° C.). Results of the impact peel testing are as indicated in Table 2. Rubber content and toughener are also identified in Table 2.

TABLE 2

| Example or Comp. Sample No. | % Rubber | Toughener | Impact Peel results, N/mm | | | | | | |
|---|---|---|---|---|---|---|---|---|---|
| | | | 80° C. | 23° C. | −20° C. | −40° C. | −50° C. | −60° C. | −70° C. |
| 1 | 5.0 | 1 | ND | 59 | ND | 60 | ND | ND | ND |
| 2 | 5.0 | 2 | ND | 63 | 70 | 62 | 68 | 52 | 0 |
| 3 | 5.0 | 3 | ND | 59 | ND | 52 | ND | ND | ND |
| 4 | 7.5 | 2 | ND | 59 | 61 | 64 | 45 | 48 | 7 |
| 5 | 7.5 | 2 | ND | 66 | 65 | 68 | 57 | 63 | 6 |
| 6 | 5.0 | 2 | ND | 59 | 60 | 59 | 58 | 58 | 55 |
| 7 | 5.0 | 2 | 53 | 60 | 63 | 62 | 63 | 60 | 58 |
| 8 | 5.7 | 2 | ND | 60 | 53 | 54 | 53 | 44 | 5 |
| 9 | 5.0 | 4 | ND | 60 | 64 | 65 | 62 | 62 | 51 |
| 10 | 5.0 | 5 | ND | 60 | 65 | 62 | 49 | 53 | 4 |
| A* | 5.0 | A | ND | 57 | 55 | 6 | 1 | 0 | 0 |

*Not an example of the invention.
ND is not determined.

As can be seen from the date in Table 2, the comparative adhesive exhibits very poor impact peel strength at −40° C. and below. Structural Adhesive examples 2 and 4-10, on the other hand, all retain most or all of their impact peel strengths to at least −60° C. and in some cases to −70° C. Note also that all of the examples of the invention exhibit higher impact peel strengths at 23° C. than does the comparative sample despite identical toughener levels in all cases.

3. Lap Shear Testing on Cold Rolled Steel

Structural Adhesive examples 1-3, 9 and 10 and Comparative Sample A are evaluated for lap shear strength in accordance with DIN EN 1465. Testing is performed at a test speed of 10 mm/minute. The substrate is 1 mm degreased cold rolled steel 14O3. Testing is performed at 23° C., with lap shear strength being measured.

Test samples are prepared using each adhesive. The bonded area in each case 25×10 mm. The adhesive layer is 0.2 mm thick. The adhesives are cured at 180° C. for 30 minutes.

Results are as indicated in Table 3.

TABLE 3

| Example or Comparative Sample No. | Toughener Type | Lap Shear Strength, MPa |
|---|---|---|
| 1 | 1 | 30 |
| 2 | 2 | 31 |
| 3 | 3 | 32 |
| 9 | 4 | 29 |
| 10 | 5 | 32 |
| A | A | 33 |

As seen from the data in Table 3, the structural adhesives of the invention have lap shear strength and elongation properties at room temperature that are very similar to those of the control.

4. Impact Peel and Lap Shear Testing on Other Metal Substrates.

Impact peel testing is performed with Example 2 and with Comparative Sample A, in the manner described above. The substrates tested are (1) 0.9 mm hot dipped zinc coated steel (8-340-LAD+2), (2) 0.9 mm electrogalvanized steel (DC04-B+ZE) and (3) 1.2 mm aluminum (AA 6016) surface pretreated with Alodine 2040. Samples are prepared as described above. Impact peel testing is performed at 23° C. and at −40° C. Lap shear testing is performed at 23° C. Results of the impact peel testing are as indicated in Table 2. Rubber content and toughener are also identified in Table 2. Results are as indicated in Table 4.

TABLE 4

| Example or Comparative Sample No. | Toughener Type | Substrate | Impact Peel Strength, 23° C. | Impact Peel Strength, −40° C. | Lap Shear Strength, MPa |
|---|---|---|---|---|---|
| 2 | 2 | HDS[1] | 60 | 59 | 32 |
| A* | A | HDS[1] | 59 | 3 | 34 |
| 2 | 2 | EG[2] | 64 | 60 | 25 |
| A* | A | EG[2] | 61 | 8 | 24 |
| 2 | 2 | Al[3] | 50 | 48 | 26 |
| A* | A | Al[3] | 42 | 9 | 27 |

[1]Hot dipped steel.
[2]Electrogalvanized steel.
[3]Aluminum.

The data in Table 4 indicates that trends seen using cold rolled steel substrates are repeated when the structural adhesives are used to bond to other metals. Impact strength for Example 2 and Comparative Sample A are very comparable at room temperature (as are lap shear strengths) on all three substrates. However, structural adhesive Example 2 retains its impact peel strength at −40° C., whereas the comparative shows nearly a complete loss of impact peel strength at −40° C.

EXAMPLES 11-13

Examples 11-13 are prepared in the same general manner described with respect to Examples 1-10. Impact peel testing is performed at 23° C. and −60° C. Lap shear testing is performed as described with respect to the previous examples. The formulation components and results are as indicated in Table 5.

TABLE 5

| | Parts By Weight Example No. | | |
|---|---|---|---|
| Components | 11 | 12 | 13 |
| PTHF toughener 2 | 18.9 | 18.9 | 18.9 |
| Toughening Rubber 3911 | 37.7 | 37.7 | 37.7 |
| DER 330 Epoxy Resin | 0 | 12.6 | 17.7 |
| DER 671 Epoxy Resin | 25.2 | 12.6 | 7.6 |
| Versatic Acid monoepoxy ester | 1.2 | 1.2 | 1.2 |
| Dynasilan A187 | 0.7 | 0.7 | 0.7 |
| Colorants | 0.4 | 0.4 | 0.4 |
| Fumed Silica | 8.1 | 8.1 | 8.1 |
| EP796 | 1.1 | 1.1 | 1.1 |
| Polyvinylbutyral | 2.9 | 2.9 | 2.9 |
| Amicure CG-1200 | 3.8 | 3.8 | 3.8 |
| Impact Peel Strength, 23° C., N/mm | 58 | 57 | 55 |
| Impact Peel Strength, −60° C., N/mm | 49 | 48 | 46 |
| Lap Shear Strength, MPa | 31 | 30 | 31 |

EXAMPLES 14-20

Examples 14-20 are prepared in the same general manner described with respect to Examples 1-10. Structural adhesive examples 14-20 all contain various amounts of fillers as indicated in Table 6. Lap shear testing is performed as described with respect to the previous examples. Impact peel strength is measured at 23° C. and −40° C. as indicated in previous examples. Young's modulus is measured at 23° C. according to DIN/EN/ISO 527-1. The substrate in all cases is 0.9 mm electrogalvanized steel (DC 04-B+ZE). Glass transition temperature is measured by differential scanning calorimetry. The formulation components and results are as indicated in Table 6.

TABLE 6

| | Parts By Weight Example No. | | | | | | |
|---|---|---|---|---|---|---|---|
| | 14 | 15 | 16 | 17 | 18 | 19 | 20 |
| Components | | | | | | | |
| PTHF toughener 2 | 17.9 | 17.9 | 18.5 | 18.0 | 18.0 | 18.0 | 18.0 |
| Strutkol 3614 | 10.2 | 9.4 | 9.1 | 8.8 | 8.3 | 7.6 | 7.6 |
| Epoxy resin mixture[1] | 29.2 | 27.1 | 26.0 | 25.3 | 22.8 | 22.2 | 21.8 |
| Epoxy resin/polyester resin blend[2] | 25.4 | 23.6 | 22.6 | 22.0 | 20.7 | 18.9 | 19.0 |
| Versatic Acid monoepoxy ester | 0.8 | 0.7 | 0.7 | 0.7 | 0.6 | 0.6 | 0.6 |
| Dynasilan A187 | 0.5 | 0.4 | 0.4 | 0.4 | 0.4 | 0.4 | 0.4 |
| Colorants | 0.3 | 0.3 | 0.3 | 0.3 | 0.3 | 0.2 | 0.2 |
| Fumed Silica | 7.9 | 7.4 | 7.1 | 6.9 | 6.5 | 6.0 | 5.9 |
| EP796 | 0.7 | 0.7 | 0.7 | 0.7 | 0.8 | 0.7 | 0.7 |
| Amicure CG-1200 | 3.8 | 3.5 | 3.4 | 3.3 | 3.1 | 2.9 | 2.8 |
| Calcium Carbonate | 0 | 5 | 7.5 | 10.0 | 15.2 | 19.4 | 10.0 |
| Wollastonite | 0 | 0 | 0 | 0 | 0 | 0 | 10.0 |
| Calcium oxide | 4.3 | 4.0 | 3.7 | 3.6 | 3.3 | 3.1 | 3.0 |
| Properties | | | | | | | |
| % Filler by weight | 4.3 | 9.0 | 11.2 | 13.6 | 18.5 | 22.5 | 23.0 |
| Lap Shear str., MPA | 22.6 | 22.1 | 21.7 | 21.9 | 20.8 | 20.0 | 20.6 |
| Impact peel str., 23° C., N/mm | 53 | 51 | 45 | 50 | 48 | 41 | 42 |
| Impact peel str., −40° C., N/mm | 47 | 46 | 45 | 48 | 40 | 37 | 41 |
| Glass transition temperature, ° C. | ND | 91 | 86 | 91 | 86 | 84 | 84 |

[1]A blend of liquid and solid diglycidyl ethers of bisphenol A.
[2]A 4:1 by weight blend of a liquid diglycidyl ether of bisphenol A and a linear hydroxyl-terminated polyester (Dynacoll 7330 from Evonik).

The results indicated in Table 6 demonstrate how structural adhesives of the invention maintain their adhesive properties with increasing amounts of fillers. Only small changes in lap shear strength and impact peel strength are seen when the filler loading level is increased from 0 to over 20% by weight. All of structural adhesive examples 14-20 have excellent lap shear strength and excellent impact peel strength both at room temperature and at −40° C.

Structural adhesive Example 20 is further evaluated for impact peel strength with a 0.8 mm galvaneal (SCGA 270) substrate. Sample preparation and testing protocols are as in previous examples. For comparison, two commercially available crash durable adhesive products are similarly evaluated. Results are as indicated in Table 7.

TABLE 7

| Example or Comparative Sample No. | Substrate | Impact Peel Strength, 23° C., N/mm |
|---|---|---|
| 20 | Galvaneal SCGA 270 | 34 |
| Commercial CDA 1* | Galvaneal SCGA 270 | 18 |
| Commercial CDA 2* | Galvaneal SCGA 270 | 20 |

*Not an example of the invention.

The results in Table 7 show that the structural adhesive of the invention has much better impact peel strength on galvaneal than do the commercial products.

Structural adhesive Example 14 is evaluated for storage stability at 23° C. and at 30° C. Storage stability is determined by measuring changes in viscosity after being stored for six months at the stated temperatures. Viscosity is measured at 45° C. using a Bohlin cone/plate viscometer (cone/plate 4/20). After being aged for six months at 23° C. in a sealed container, the viscosity of structural adhesive Example 14 increases from 108 to only 142 Pa·s. For comparison, a commercially available crash durable adhesive product shows a viscosity increase of from 175 to 555 Pa·s when aged under similar conditions for six months.

What is claimed is:

1. A one-component structural adhesive, comprising:
   A) one or more epoxy resins;
   B) at least one toughening rubber;
   C) a polytetrahydrofuran-based toughener that has isocyanate groups that are blocked or capped with a phenolic compound, an aminophenolic compound, a primary or secondary aliphatic or cycloaliphatic amine, an alkyl alcohol, an aromatic amine, an alkyl benzyl amine or an alkyl thiol; and
   D) one or more epoxy curing agents;
   wherein the polytetrahydrofuran-based toughener includes a liquid or low-melting elastomeric material having capped or blocked reactive groups and at least one polytetrahydrofuran block having a molecular weight of from 2200 to 4500 daltons.

2. The structural adhesive of claim 1, wherein the polytetrahydrofuran-based toughener is formed by reacting a polytetrahydrofuran polyol and an aliphatic polyisocyanate, and optionally a small quantity of a branching or crosslinking agent having 3 or more isocyanate-reactive group per molecule, to form a prepolymer having free isocyanate groups, and then blocking the isocyanate groups.

3. The structural adhesive of claim 2, wherein the prepolymer having free isocyanate groups has an isocyanate content of from 0.5 to 4% by weight.

4. The structural adhesive of claim 3, wherein the epoxy resin includes at least one diglycidyl ether of a bisphenol.

5. The structural adhesive of claim 4, wherein the toughening rubber includes at least one core-shell rubber.

6. The structural adhesive of claim 5, wherein the core-shell rubber has a rubbery core that has a $T_g$ of less than −50° C. and at least one shell portion having a $T_g$ of at least 50° C.

7. The structural adhesive of claim 1, wherein the toughening rubber is an epoxy-terminated adduct of an epoxy resin and at least one liquid rubber that has epoxide-reactive groups, such as amino or preferably carboxyl groups.

8. The structural adhesive of claim 7, wherein the liquid rubber is a carboxyl-terminated butadiene-acrylonitrile copolymer that contains up to 30 weight percent polymerized unsaturated nitrile monomer.

9. The structural adhesive of claim 1, which has total rubber content of from 3 to 15 weight percent.

10. The structural adhesive of claim 1, which contains from 5 to 30 weight percent of the polytetrahydrofuran-based toughener.

11. The structural adhesive of claim 10, wherein the polytetrahydrofuran-based toughener has a weight average molecular weight of from 8,000 to 80,000.

12. The structural adhesive of claim 1, further containing at least one filler.

13. The structural adhesive of claim 12, which contains from 10 to 25% by weight filler.

14. The structural adhesive of claim 1, wherein the polytetrahydrofuran block has a molecular weight of from 2500 to 3500 daltons.

15. A method comprising applying the structural adhesive of claim 1 to the surfaces of two metals, and curing the structural adhesive to form an adhesive bond between the two metals.

16. The method of claim 15, wherein at least one of the metals is galvaneal.

* * * * *